Sept. 15, 1936.    O. WULFERT    2,054,644
MOTOR DRIVE FOR TOY TRUCKS OR THE LIKE
Filed March 5, 1934
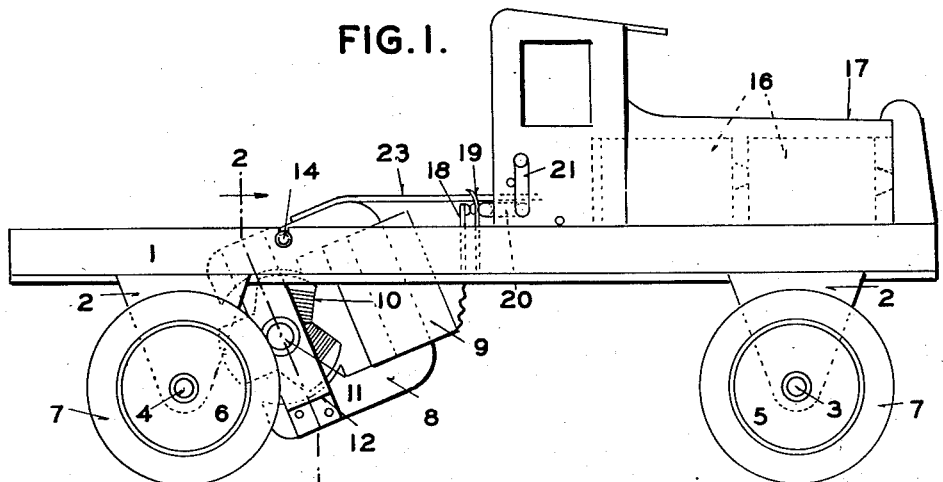
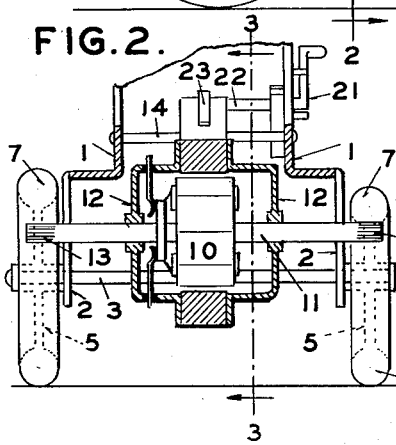
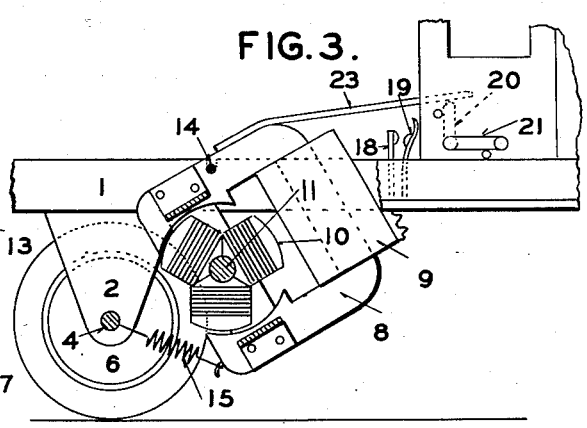
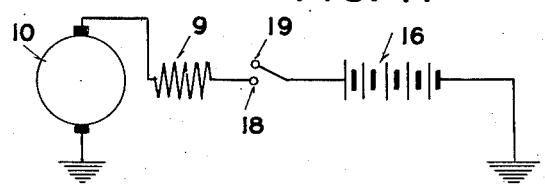
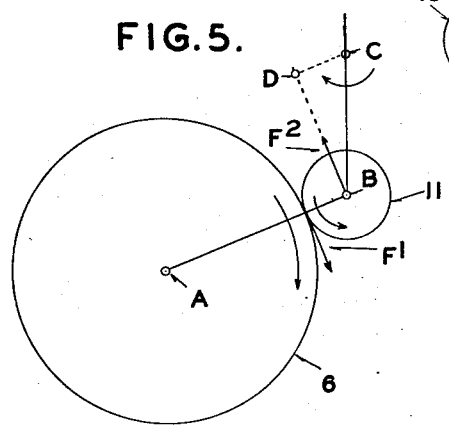
Inventor
O. Wulfert
By [signature]
Att'y Patented Sept. 15, 1936

2,054,644

UNITED STATES PATENT OFFICE 2,054,644

MOTOR DRIVE FOR TOY TRUCKS OR THE LIKE

Otto Wulfert, St. Louis, Mo., assignor to Wagner Electric Corporation, St. Louis, Mo., a corporation of Delaware Application March 5, 1934, Serial No. 714,090

7 Claims. (Cl. 46—206)

My invention relates to toy trucks, locomotives, or other vehicles, and particularly to the driving means therefor. Heretofore it has been usual to transmit power from the motor to the vehicle wheel by means of gearing, belts and pulleys or similar machine elements.

One of the objects of my invention is to provide means whereby the wheels are driven directly from the armature shaft of the motor, thus simplifying the device and reducing its cost of manufacture.

Another object of my invention is to so arrange the driving means that the pressure between the driving and driven members will increase with increase of the motor torque whereby friction in the bearings is reduced at light load with decrease in current consumption and consequent increase in battery life.

Still another object of my invention is to provide means for disengaging the motor from the wheels and at the same time stopping the flow of current to the motor.

In the accompanying drawing, which illustrates a toy truck made in accordance with my invention, Figure 1 is a side elevation; Figure 2 is a section taken on the line 2—2 of Figure 1, the motor field coil being omitted to better show some of the other parts; Figure 3 is a fragmentary view, partly in elevation and partly in section, on the line 3—3 of Figure 2; Figure 4 is a wiring diagram; and Figure 5 is a diagram of forces.

The frame of the vehicle, indicated by the figure 1, is provided with downwardly projecting brackets 2 in which are carried the front and rear axles 3 and 4, respectively. Rotatably mounted on the axles 3 and 4 are the front and rear wheels 5 and 6, respectively, both pairs of wheels being provided with rubber tires 7.

The motor comprises a stator iron 8 provided with a field coil 9 and an armature 10 the shaft 11 of which is journaled in brackets 12 secured to the pole pieces of the stator iron. The shaft 11 is extended a sufficient distance at each side of the motor to engage with the rubber tires 7 of the rear wheels and its ends are fluted or otherwise roughened, as shown at 13, to provide a good driving contact with the tires 7. The motor is pivotally suspended from the truck frame 1 by means of a pin 14 so that the weight of the motor will press the ends of the armature shaft 11 against the tires of the rear wheels 6. The amount of pressure so exerted should be just sufficient to drive the truck at minimum load.

In case the weight of the motor fails to supply sufficient pressure, it may be augmented by the tension of a coil spring 15 (Figure 3) secured at one end to the stator iron and at the other to the rear axle 4. Current is supplied to the motor from one or more batteries 16 contained in the hood 17 of the truck. Interposed in the circuit is a switch composed of a fixed contact 18 and a movable contact 19, the latter being carried upon a spring so as to move away from the former when free. The contacts 18 and 19 are held together by a crank arm 20 operated by a handle 21. The crank arm 20 is provided with an extension 22 projecting under a lever 23 secured to the stator iron, so that when the handle 21 is moved into the position shown in Figure 3 not only is the circuit through the motor broken, but the motor is swung on its pivot 14 to disengage the armature shaft from the wheels.

In Figure 5 I have diagrammatically illustrated the means by which increasing pressure between the driving and driven members is secured with increasing torque of the motor. In this diagram A indicates the axis of the wheels 6, B the axis of the armature shaft, and C the point of suspension of the motor. To drive the vehicle forward, the wheels 6 must revolve in a clockwise direction and the shaft 11 in a counter-clockwise direction. The motor exerts a torque which may be represented by two parallel forces $F^1$ and $F^2$. The force $F^1$ is counteracted by a force set up by the resistance of the wheels to rotation. The force $F^2$, however, is not counteracted and is free to produce a turning moment around the suspension point C. This turning moment tends to rotate the motor around the point C in a clockwise direction and thereby increase the pressure between the driving shaft and the wheels. It will be seen, therefore, that the pressure increases as the force $F^2$ increases, that is, the greater the motor torque the greater the pressure between the driving and driven members. The measure of this increased pressure is the product of the force $F^2$ and a quantity represented by the lines C, D, that is, the tangent of the angle C, B, D which is the excess of the angle A, B, C over 90 degrees. If angle A, B, C were 90 degrees, C and D would coincide and the force $F^2$ would act directly against the point of suspension so that there would be no tendency to turn the motor on its pivot. If the angle A, B, C is made less than 90 degrees, the tendency will be to turn the motor around the pivot point in a counter-clockwise direction and thus decrease rather than increase the pressure between the driving and driven members.

Having fully described my invention, what I claim as new and desire to secure by Letters Patent of the United States is:

1. In a device of the class described, the combination with a vehicle frame, of wheels supporting said frame, a pivotally mounted motor including a shaft engaging said wheels, the angle included between the line connecting the axis of the wheels and the axis of the driving shaft and that connecting the axis of the shaft and the pivot point of the motor being greater than 90 degrees, whereby pressure between the shaft and wheels is automatically increased with increasing torque of the motor.

2. In a device of the class described, the combination with a vehicle frame, of wheels supporting said frame, resilient tires for said wheels, a motor mounted on said frame and movable relatively thereto, a shaft driven by said motor and adapted to contact with said tires, and automatically controlled means for biasing the motor toward the wheels, whereby the wheels are directly driven from the motor.

3. In a device of the class described, the combination with a vehicle frame, of wheels supporting said frame, an electric motor carried by said frame and movable relatively thereto, the armature shaft of said motor being adapted to engage said wheels, a supply circuit for said motor, a switch in said supply circuit, and means associated with said switch for moving the motor to engage and disengage said shaft from the wheels.

4. In a device of the class described, the combination with a vehicle frame, of wheels supporting said frame, an electric motor carried by said frame and movable relatively thereto, the armature shaft of said motor being adapted to engage said wheels, a source of E. M. F. for said motor, and means for moving said motor to disengage the armature shaft from the wheels and for interrupting the supply of E. M. F. to the motor.

5. In a device of the class described, the combination with a vehicle frame, of wheels supporting said frame, a motor pivotally mounted on said frame, the armature shaft of said motor being adapted to engage with said wheels, a source of E. M. F. for said motor, and means for swinging said motor on its pivot to disengage the armature shaft from the wheels and for interrupting the supply of E. M. F. to the motor.

6. In a device of the class described, the combination with a vehicle frame, of wheels supporting said frame, resilient tires for said wheels, an electric motor carried by said frame and movable relatively thereto, the armature shaft of said motor having roughened peripheries adapted to engage said wheels, a source of E. M. F. for the motor, and means for moving said motor relatively to the frame to disengage the shaft from the wheels and for interrupting the supply of E. M. F. to the motor.

7. In a device of the class described, the combination with a vehicle frame, of wheels supporting said frame, an electric motor pivotally mounted on said frame, the armature shaft of said motor being adapted to engage with said wheels, the angle included between the line connecting the axis of the wheels and the axis of the driving shaft and that connecting the axis of the shaft and the pivot point of the motor being greater than 90 degrees, a source of E. M. F. for the motor, and means for swinging the motor on its pivot to disconnect the shaft from the wheels and for interrupting the motor circuit.

OTTO WULFERT.